United States Patent [19]

Schlicher

[11] 4,124,915
[45] Nov. 14, 1978

[54] COMBINATION SCRAPER AND SQUEEGEE

[75] Inventor: Charles W. Schlicher, Wichita, Kans.

[73] Assignee: S/V Tool Company, Inc., Newton, Kans.

[21] Appl. No.: 824,658

[22] Filed: Aug. 15, 1977

[51] Int. Cl.² .............................. A47L 1/06; B60S 1/02
[52] U.S. Cl. .................................... 15/105; 15/236 R; 15/245
[58] Field of Search ............ 15/105, 117, 121, 250.40, 15/250.41

[56] References Cited

U.S. PATENT DOCUMENTS

| 217,081 | 7/1879 | Epting | 15/105 V X |
| 585,346 | 6/1897 | Stewart | 15/105 |
| 3,540,071 | 11/1970 | Jorgensen | 15/105 |

FOREIGN PATENT DOCUMENTS

| 854,398 | 1/1940 | France | 15/250.40 |
| 909,288 | 10/1962 | United Kingdom | 15/121 |
| 1,062,541 | 3/1967 | United Kingdom | 15/245 |

Primary Examiner—Daniel Blum
Attorney, Agent, or Firm—Schmidt, Johnson, Hovey & Williams

[57] ABSTRACT

A hand tool especially adapted for cleaning automotive windows and windshields has a plate set in the head of a handle and provided with an ice-scraping edge. A squeegee, also set in the head, has a blade for wiping away slush and fog as well as ice broken loose by the edged plate. The rigid plate has a snap fit into the head and a lock for holding the flexible squeegee against displacement. The plate and the blade have strategic locations on the head in relation to each other such as to eliminate the need for tool turn-over or other difficult, time-consuming maneuvers during successive scraping and wiping actions across the surface being cleaned.

4 Claims, 6 Drawing Figures

COMBINATION SCRAPER AND SQUEEGEE

My present invention relates to a surface cleaning instrument combining scraping and wiping features in a manner to render its use simple and handy. To this end the scraper edge is located in leading relationship for facilitating a forceful pushing action against difficult to break ice. The squeegee blade, on the other hand, is located at the bottom of the tool, permitting successive wiping strokes while the position of the tool remains unchanged from that used during scraping.

It therefore becomes an important object of the instant invention to provide a lock within the head which takes advantage of the rigid nature of the scraper plate as a means for holding the flexible squeegee in place.

Figure 1:
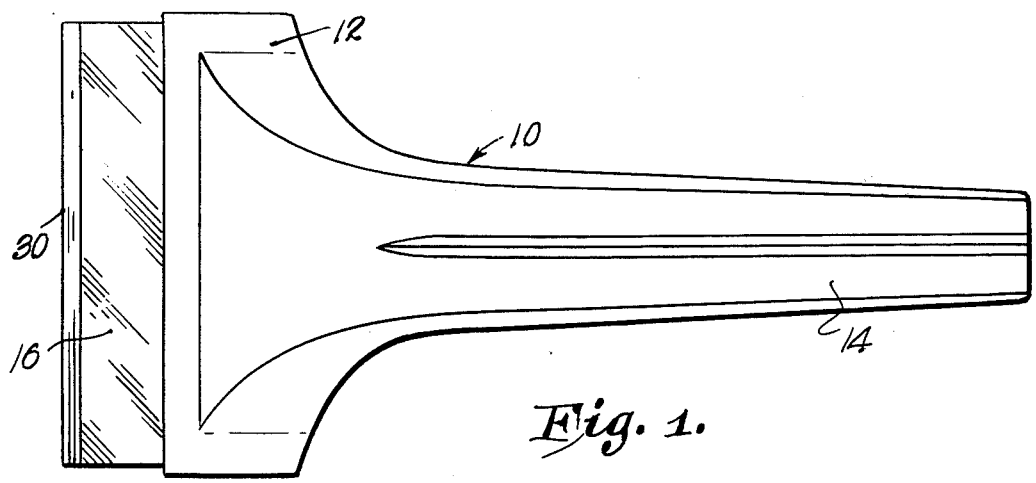
FIG. 1 is a top plan view of a combination scraper and squeegee made in accordance with my present invention.
Figure 2:
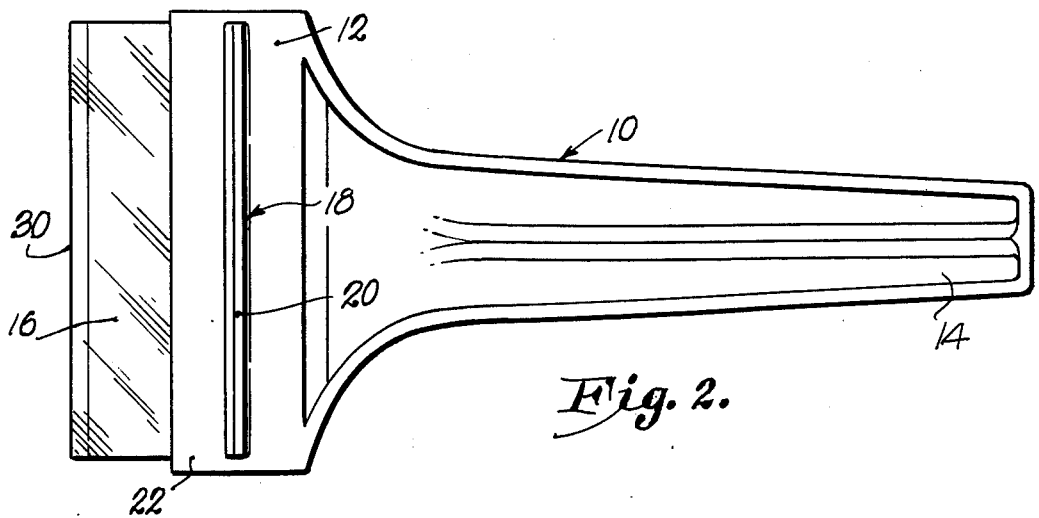
FIG. 2 is a bottom view thereof.
Figure 3:
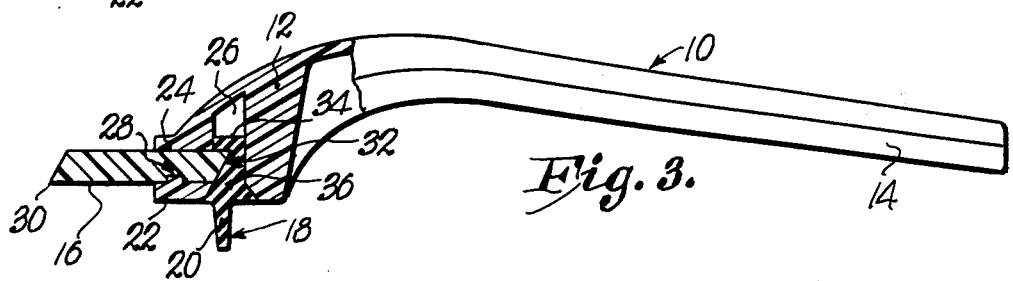
FIG. 3 is a side elevational view, parts being broken away and in section to show one form of scraper-squeegee lock.

The generally T-shaped hand tool 10 shown in FIGS. 1-3 has an elongated, hollow head 12 integral with a transversely U-shaped handle 14 and into which is set a flat scraper plate 16 of rigid material and a squeegee 18. The plate 16 extends forwardly from the head 12 whereas the squeegee 18 has a flexible wiping blade 20 normal to the plate and extending downwardly from a normally lowermost face 22 of the head 12.

The rectangular plate 16 and the squeegee 18 are substantially coextensive in length with the head 12 and fitted into a pair of intersecting slots 24 and 26 respectively formed in the head 12. A tongue and groove joint 28 in the slot 24 fastens the plate 16 to the head 12 and a lock in the slot 26 holds the squeegee against displacement from the head 12.

The longitudinal edges of the plate 16 are beveled to present a leading scraper edge 30 exteriorly of the head 12, and a groove 32 in the squeegee 18 is shaped to conform with the configuration of the inner beveled surface of the plate 16.

After insertion of the squeegee 18 into the slot 26, the plate 16 is inserted into the slot 24 with a snap fit past the joint 28 until the inner beveled edge of the plate 16 seats within the groove 32, thereby locking the squeegee 18 in place. While the head 12 is essentially inflexible, it is capable of yielding sufficiently at the slot 24 to permit insertion of the plate 16 until the tongue of the joint 28 snaps into the groove of the latter.

The groove 32 in the squeegee 18 presents a longitudinally-extending rib 34 which is lapped or hooked over the proximal marginal edge of the plate 16, such hooking serving to establish a positive lock for the squeegee 18. To the end that the groove 32 is aligned with the slot 24 before receiving the plate 16, the slot 26 has a relatively wide mouth throughout its length which seats a thick portion 36 of the squeegee 18, thereby determining the extent of insertion of the squeegee 18 into its slot 26. The portion 36 also provides a suitable base for the appreciably thinner and more flexible blade 20.

Figure 4:
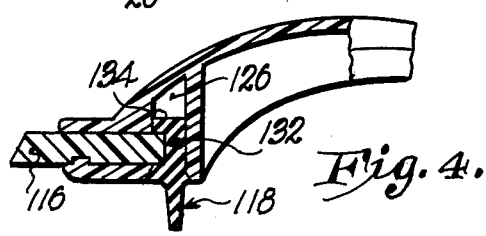
FIG. 4-6 are fragmentary views similar to FIG. 3 showing additional embodiments of the lock.

The embodiment of my invention shown in FIG. 4 is in all respects the same as that shown in FIGS. 1-3 except calling for a different type of hook-like lock for the squeegee 118. The inner longitudinal edge of the plate 116 is normal to its upper and lower faces, i.e. unbeveled. Groove 132 in the squeegee 118 is transversely U-shaped to complementily receive and seat the plate 116, presenting a rib 134 which overlaps or hooks over the plate 116 within slot 126.

Figure 5:
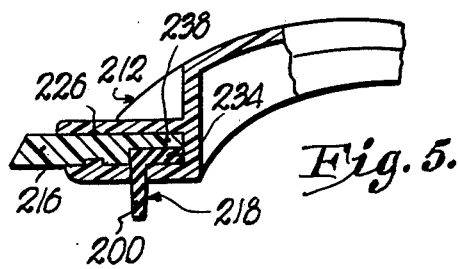

In the modification illustrated in FIG. 5, squeegee 218 is L-shaped, presenting a blade 200 and a rib 234 extending rearwardly and lapping head 212 within slot 226. Plate 216 has a flange 238 lapped over the rib 234 to lock the squeegee 218 into place.

Figure 6:
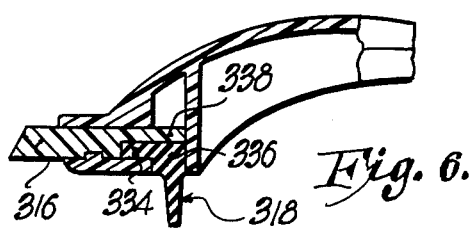

In FIG. 6 of the drawing, squeegee 318 has a thickened portion 336 as in FIGS. 1-4 and a rib 334 as in FIG. 5, except that rib 334 extends forwardly. In this form of my invention, flange 338 of plate 316 locks the squeegee 318 in place the same as in FIG. 5.

I claim:

1. A hand tool for cleaning surfaces comprising:
    a handle provided with a hollow head having a normally lowermost face;
    a rigid plate in said head and extending forwardly therefrom, said plate having a leading scraper edge exteriorly of the head;
    a joint within the head fastening the plate thereto; and
    a squeegee in said head, said squeegee being provided with a flexible wiping blade normal to said plate and extending downwardly from said face, said plate having means within said head locking the squeegee against displacement from the head, said locking means comprising a portion of said plate received in a groove in the squeegee.

2. The invention of claim 1, said plate having an elongated, beveled surface fitted within the groove, said groove being shaped to conform with the configuration of said surface.

3. The invention of claim 1, said groove being transversely U-shaped, said plate filling the groove.

4. A hand tool for cleaning surfaces comprising:
    a handle provided with a hollow head having a normally lowermost face;
    a rigid plate in said head and extending forwardly therefrom,
    said plate having a leading scraper edge exteriorly of the head;
    a joint within the head fastening the plate thereto; and
    a squeegee in said head,
    said squeegee being provided with a flexible wiping blade normal to said plate and extending downwardly from said face,
    said plate having means within said head locking the squeegee against displacement from the head,
    said squeegee having a rib in lapped relation to the head within the latter, said locking means comprising a flange on the plate lapped over said rib.

* * * * *